United States Patent [19]

Fujikura

[11] 4,045,821
[45] Aug. 30, 1977

[54] TAPE CARTRIDGE HAVING A SHUTTER WITH SELF LOCKING FUNCTION

[75] Inventor: Hiroshi Fujikura, Fujisawa, Japan

[73] Assignee: International Business Machines Corporation, Armonk, N.Y.

[21] Appl. No.: 680,398

[22] Filed: Apr. 26, 1976

[30] Foreign Application Priority Data

Aug. 29, 1975  Japan .............................. 50-104075

[51] Int. Cl.² .......................................... G11B 23/04
[52] U.S. Cl. ................................. 360/132; 242/197;
352/76
[58] Field of Search ................... 360/132; 352/75, 76;
242/55, 19 A, 71.2, 197–200

[56] References Cited

U.S. PATENT DOCUMENTS

| 2,095,850 | 10/1937 | Wittel ..................................... 352/75 |
| 3,371,882 | 3/1968 | Orlando et al. ..................... 242/209 |
| 3,620,478 | 11/1971 | Fitzgerald et al. .................. 242/197 |

Primary Examiner—Robert S. Tupper
Attorney, Agent, or Firm—Herbert F. Somermeyer

[57] ABSTRACT

A tape containing cartridge has a front wall with a transducer-receiving opening and a side wall has a capstan-receiving opening. A flexible sliding shutter is disposed in a shutter guide extending across said openings inside the cartridge. The flexible shutter can be slid between an open position where both openings are exposed and a closed position where both openings are covered for protecting a tape in the cartridge. The flexible sliding shutter has a flexible bifurcated detent such that in a closed position of the shutter the detent is positioned along a second side wall closer to the front wall while in the open position of the shutter it is positioned along the second side wall closer to the back wall. The bifurcated detent has pawls at its bifurcated end which, in the closed position of the shutter, engage the guide locking the shutter closed. To play the tape, the tape cartridge is inserted into a cartridge housing of a tape cartridge player with the front wall being a leading plane. A shutter opening member of the player engages the bifurcated detent on the shutter, flexes the free bifurcated ends inwards to unlock the shutter for sliding to the open position. As the cartridge is being removed from a player, a shutter closing member on the player moves the shutter to a closed position.

15 Claims, 24 Drawing Figures

FIG. 5F
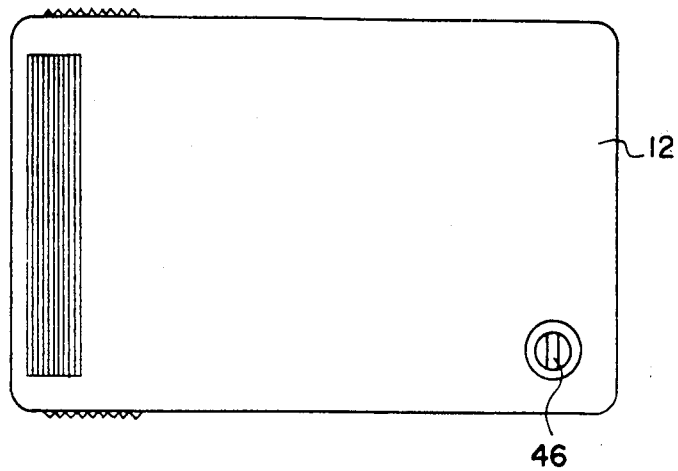
FIG. 5E
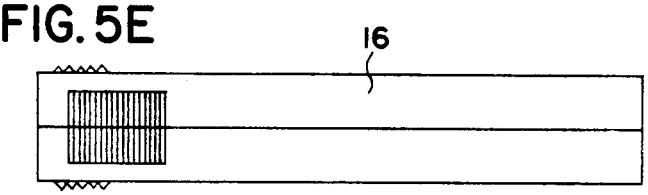
FIG. 5D   FIG. 5C   FIG. 5B
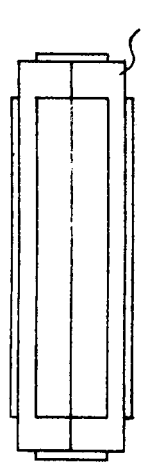 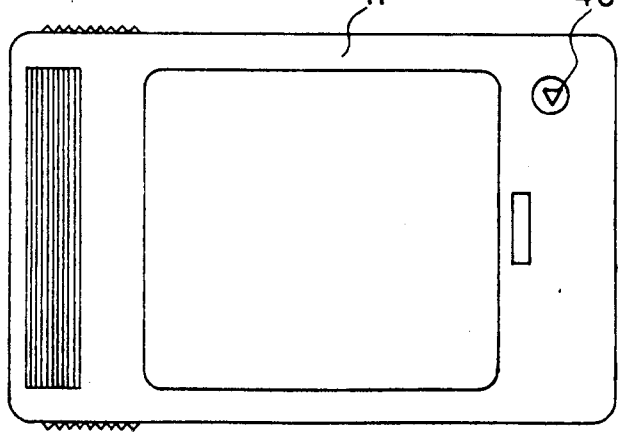 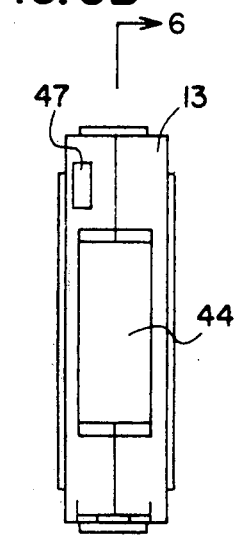
FIG. 5A
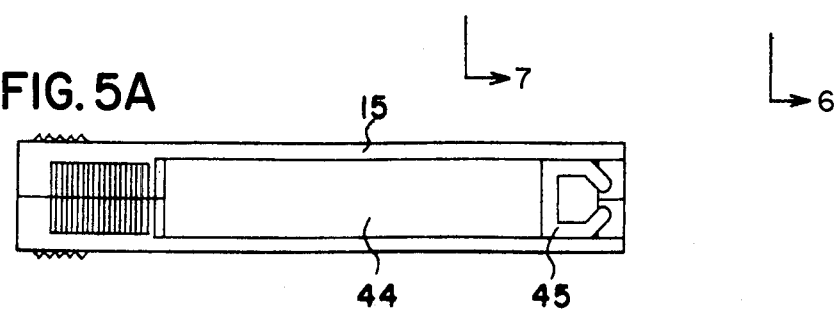

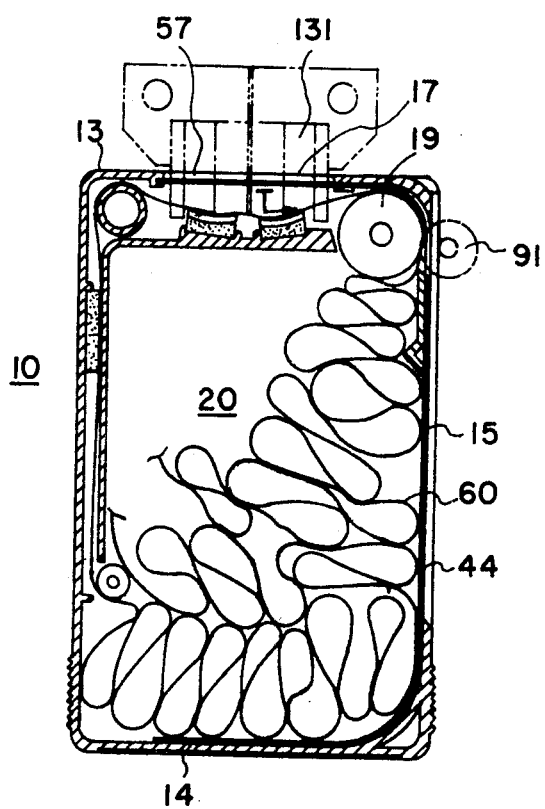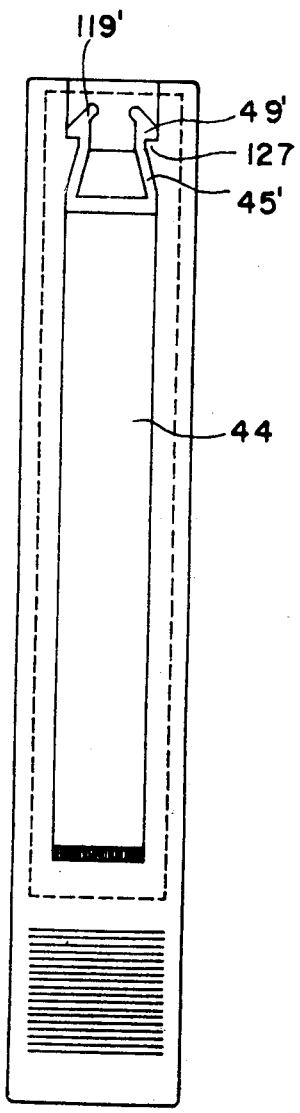

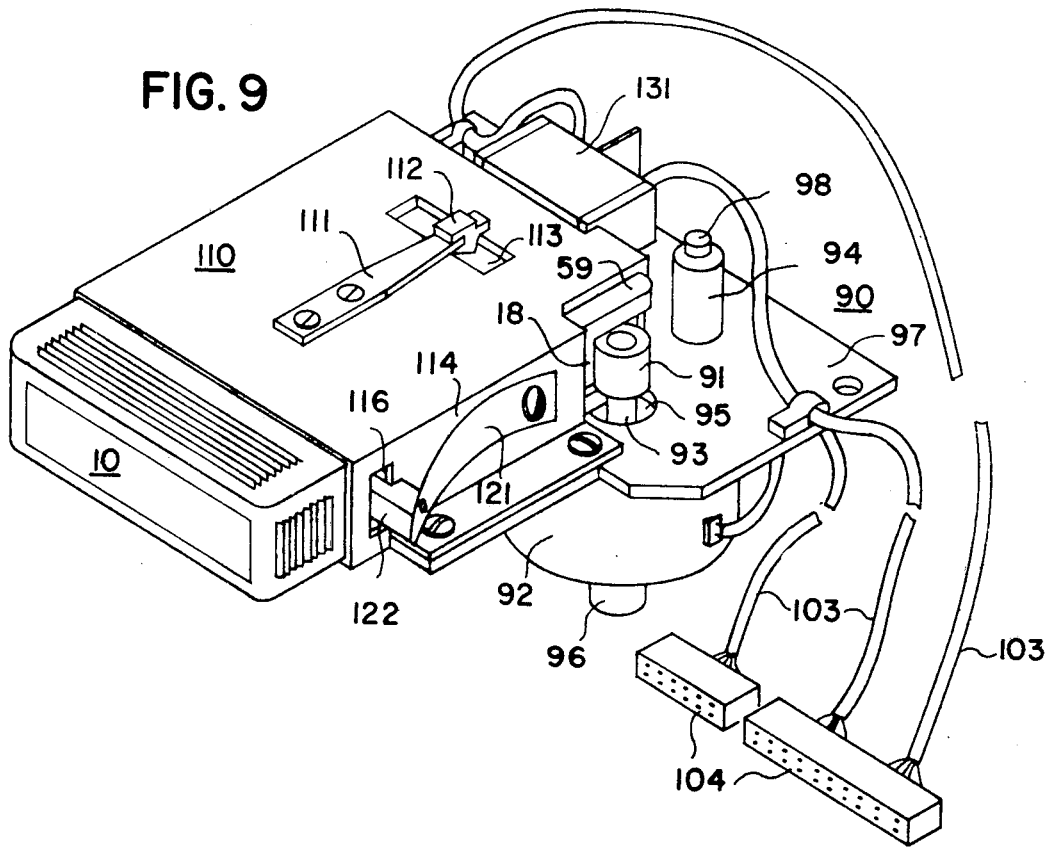
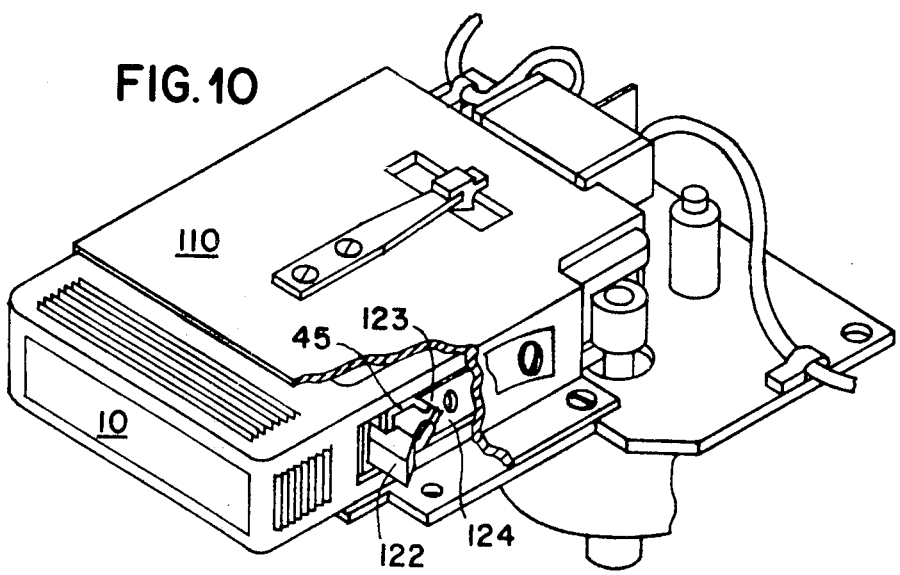

TAPE CARTRIDGE HAVING A SHUTTER WITH SELF LOCKING FUNCTION

BACKGROUND OF THE INVENTION

The present invention relates generally to a tape cartridge having a shutter and more particularly to a tape cartridge having an access opening to the inside thereof and a shutter with a self-locking function capable of being opened and closed for covering said access opening.

A tape cartridge such as a tape cartridge for storing a tape such as a magnetic tape, an ink ribbon, etc. therein generally has an access opening for allowing operational engagement between the tape in the tape cartridge and an external tape operating member, such as a magnetic head, a tape driving capstan, etc. A tape cartridge is already known in the prior art which has a slidable shutter capable of being opened and closed for covering such an access opening when the tape cartridge is not used in order to prevent dust and trash from adhering to the tape in the tape cartridge through the access opening or prevent the tape from suffering damage due to external physical force or prevent the tape from protruding out of the access opening when the tape becomes loose while the tape cartridge is stored or carried.

An example of such a prior art tape cartridge having a shutter is shown in FIG. 1. Also, FIGS. 2A, 2B, 3A, 3B, respectively disclose a tape cartridge having a flexible shutter slidable along a peripheral wall of the tape cartridge and a shutter opening and closing mechanism attached to a tape cartridge player which cooperates with said shutter to automatically open and close it when said tape cartridge is inserted into and removed from a cartridge housing of the tape cartridge player.

In these prior art tape cartridges, the shutter can be slid to completely cover the access opening but is provided with no mechanism for locking it in its closed position. Since the tape cartridge can be often touched with hands or brought into contact with other external components while being stored or carried, the shutter is liable to be inadvertently opened. Further, the shutter may sometimes be opened when the tape cartridge is laterally moved while being carried. Such inadvertent opening of the shutter makes it meaningless to provide the shutter.

In order to perfectly protect the tape in the tape cartridge from dust and external force, it is necessary that the shutter is self-locked so as not to be easily opened by external artificial or physical force ordinarily applied to the tape cartridge while being stored or carried and yet the shutter is easily automatically unlocked when the tape cartridge is inserted into the cartridge housing of the tape cartridge player.

Accordingly, it is an object of the present invention to provide a tape cartridge having a shutter with a self-locking function.

It is another object of the present invention to provide a tape cartridge having a shutter with a self-locking function wherein the shutter is automatically self-locked in its closed position when the tape cartridge is removed from a cartridge housing of a tape cartridge player and automatically unlocked allowing it to be opened when the tape cartridge is inserted into the tape cartridge player but not easily unlocked by external forces ordinarily applied to the tape cartridge while being stored or carried.

A feature of the present invention consists in that a shutter made of a flexible thin plate is provided so as to be slidable along a peripheral wall of a tape cartridge. A flexible bifurcated or substantially U-shaped member is attached to the shutter with its bifurcated ends forming free ends so that said shutter may be self-locked in its closed position by causing pawls formed at said bifurcated ends of the U-shaped member to be engaged with recesses formed in the peripheral wall of said tape cartridge and unlocked by disengaging said pawls from the recesses by applying external force to flex the said bifurcated ends inwardly.

The foregoing and other objects, features, and advantages of the invention will be apparent from the following more particular description of preferred embodiments of the invention, as illustrated in the accompanying drawings.

THE DRAWINGS

Figure 4A:
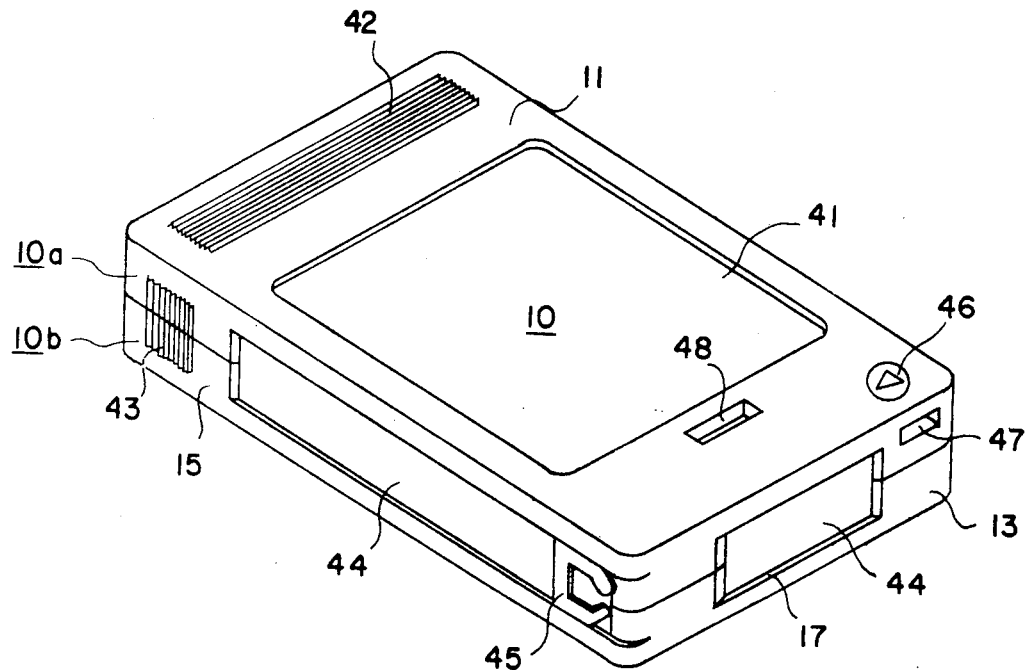
FIGS. 4A and 4B are perspective views illustrating the external appearances of a tape cartridge in accordance with an embodiment of the present invention with a shutter being in its closed and opened positions, respectively.

FIGS. 5A and 5F respectively show six plan views of the tape cartridge shown in FIG. 4A.

Figure 6:
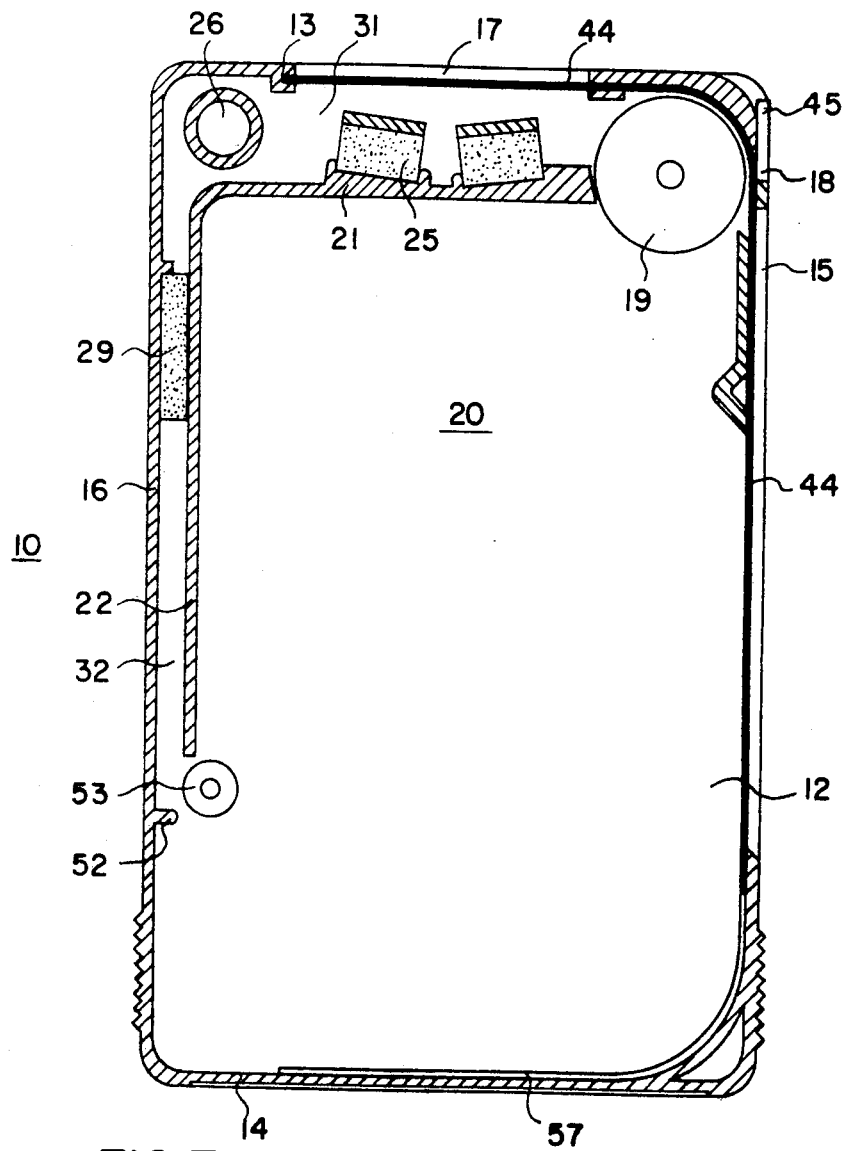
Figure 7:
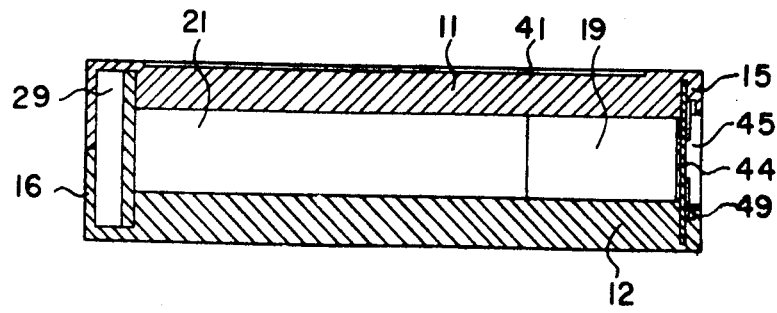

FIG. 6 and 7 are enlarged sectional views respectively taken along the lines VI — VI and VII — VII of FIGS. 5B and 5C in the directions indicated by the arrows and shown with a tape removed for the purpose of clarity.

FIG. 8 is a sectional view similar to FIG. 6, illustrating the movement of an endless tape stored in the form of random loops.

FIG. 9 is a perspective view illustrating the operational engagement between capstan driving means and a cartridge housing of a tape cartridge player and the tape cartridge in accordance with the present invention.

FIG. 10 is a view similar to FIG. 9, shown with a part of the cartridge housing cut away to illustrate the relation between a detent of the shutter of the tape cartridge and shutter opening and closing actuators in accordance with the present invention.

Figure 11A:
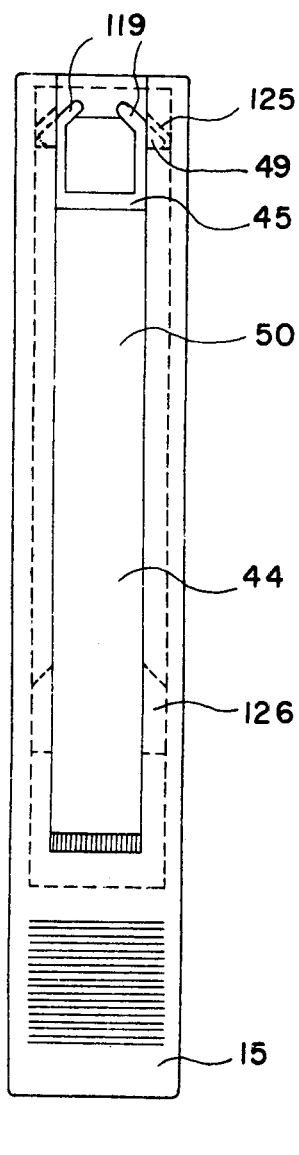
Figure 11B:
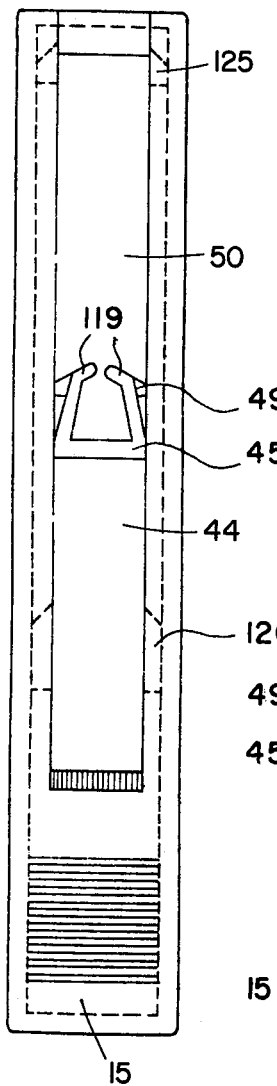
Figure 11C:
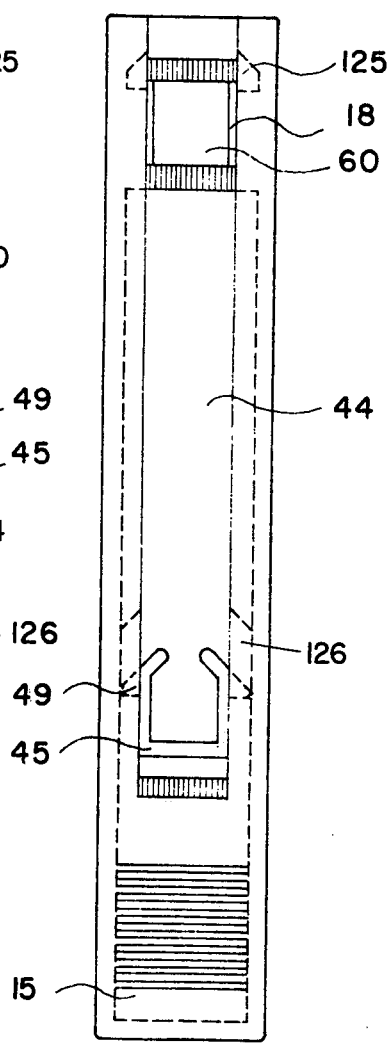

FIGS. 11A, 11B and 11C are enlarged side views illustrating the tape cartridge respectively with the shutter being in its closed position, intermediate between its closed and opened positions, and in its opened position.

Figure 12A:
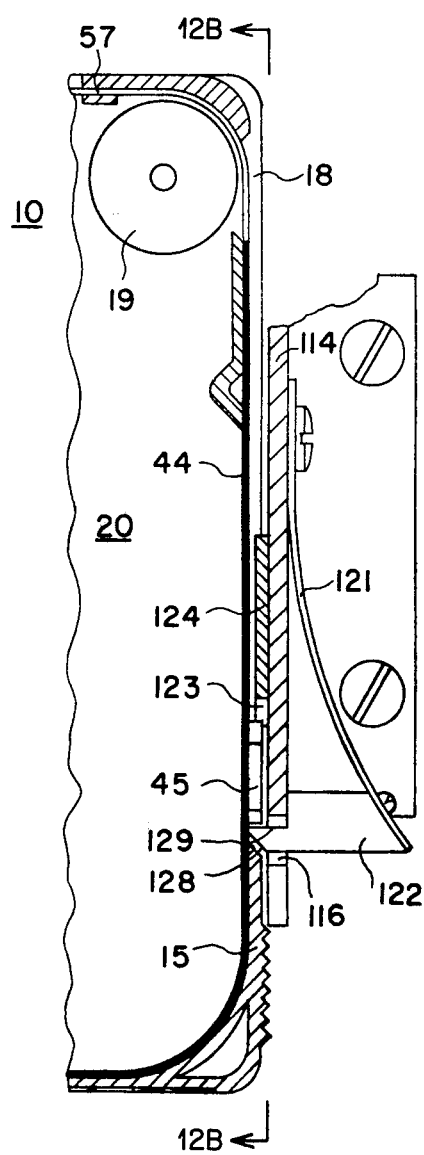

FIG. 12A is a partial enlarged view illustrating the relation between the detent of the shutter and the shutter opening and closing actuators.

Figure 12B:
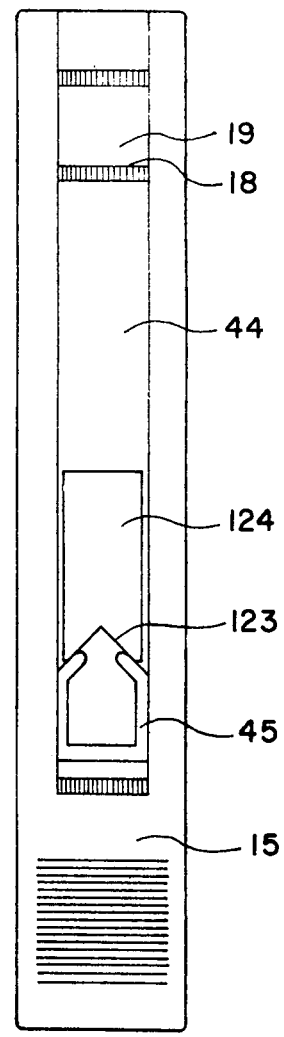

FIG. 12B is an enlarged view taken along the line XIIB — XIIB on FIG. 12A in the direction indicated by the arrows.

FIG. 13 is a side view illustrating a tape cartridge in accordance with another embodiment of the present invention.

DETAILED DESCRIPTION

Referring now to the drawings, like numerals indicate corresponding parts in the various figures, both in the prior art FIGS. 1 - 3B and in the remaining FIGURES showing the invention. The structures of the prior art tape cartridges and the structures of the tape cartridges in accordance with preferred embodiments of the present invention will be first explained more in detail.

DESCRIPTION OF PRIOR ART

Figure 1:
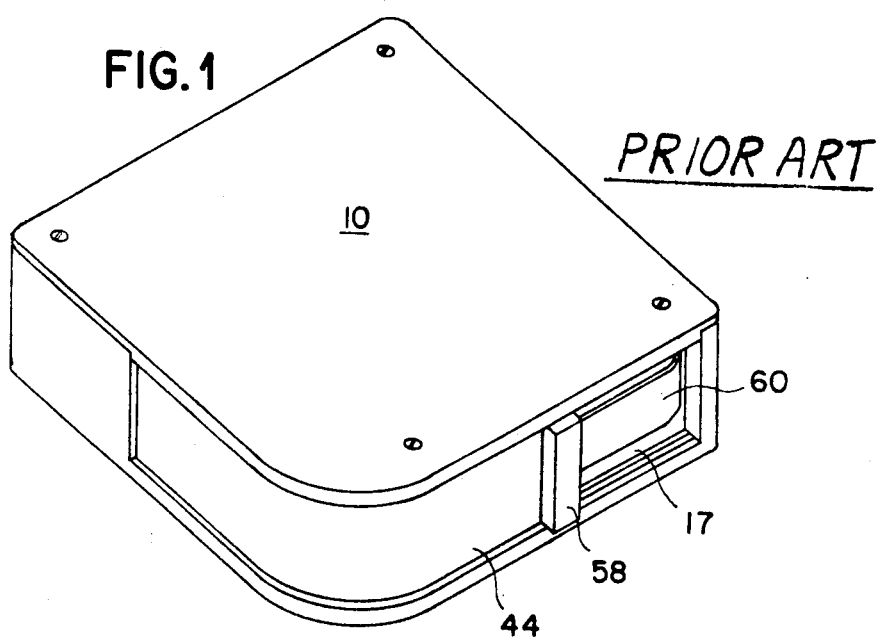
FIG. 1 is a view illustrating a prior art tape cartridge having a shutter.
Figure 2A:
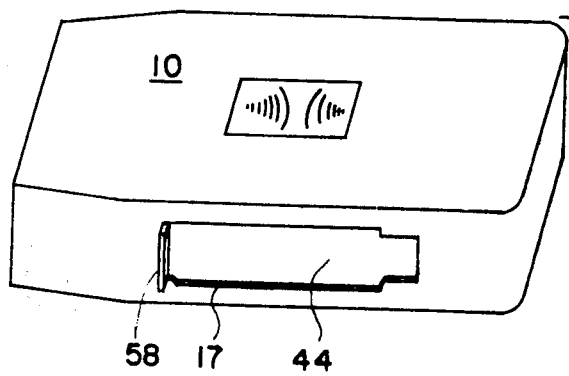
FIGS. 2A and 2B are views respectively illustrating another prior art tape cartridge having a shutter and a shutter opening and closing mechanism therefor.
Figure 2B:
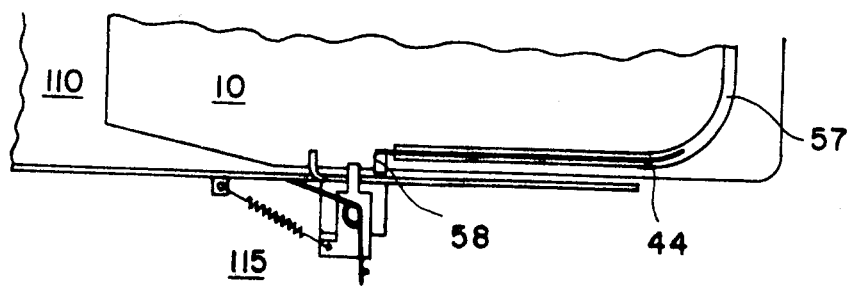
Figure 3A:
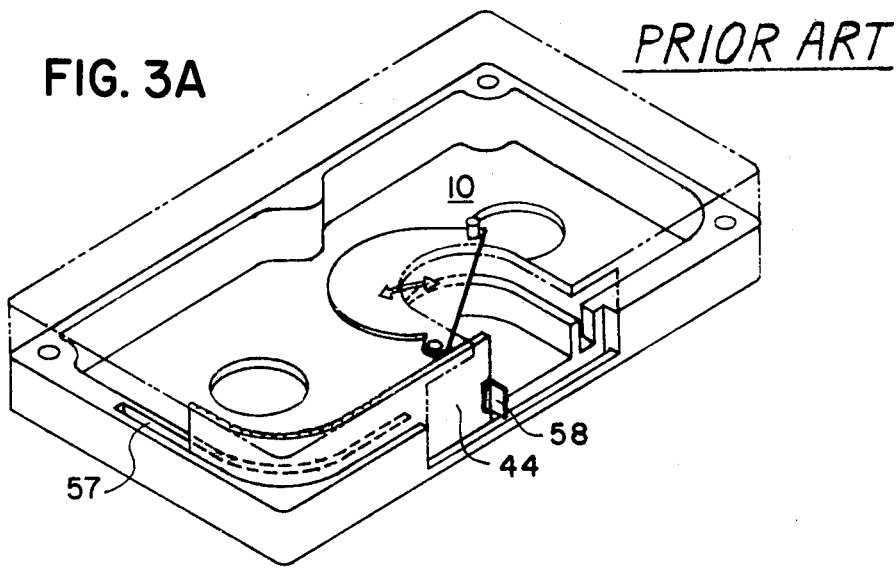
FIGS. 3A and 3B are views respectively illustrating an additional prior art tape cartridge having a shutter and a shutter opening and closing mechanism therefor.
Figure 3B:
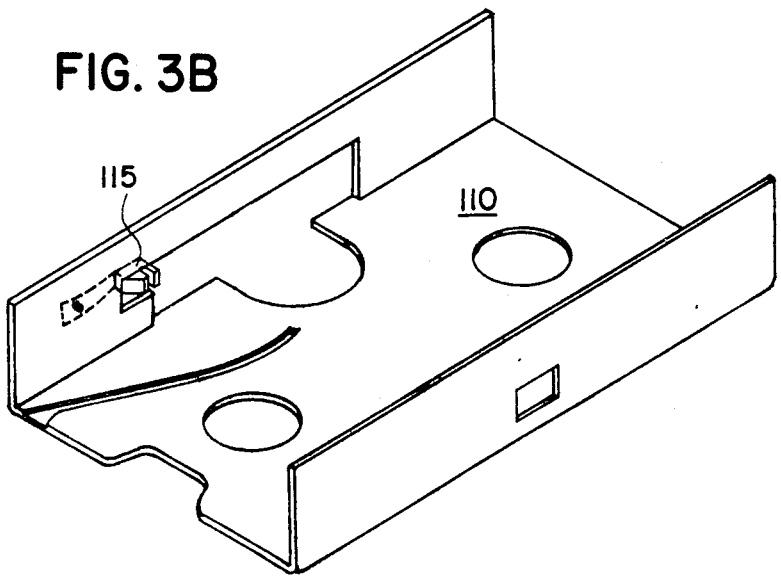

FIG. 1 is a view illustrating a tape cartridge 10 with a shutter being in its open position. The tape cartridge 10 has an access opening 17 for a tape 60 therein and a flexible shutter 44 for covering said access opening is provided so as to be slidable along a peripheral wall of tape cartridge 10. An outward projection 58 is attached to shutter 44. FIGS. 2A and 2B are views respectively illustrating another tape cartridge 10 having a shutter 44 pulse shutter opening and closing mechanism 115. The flexible shutter 44 is slidable in shutter guide 57 extending along a peripheral wall of such tape cartridge 10. A cartridge housing 110 of a tape cartridge players is provided with the shutter opening and closing mechanism 115, which cooperates with an outward projection 58 attached to shutter 44 to automatically open and close the shutter 44 when the tape cartridge is inserted into and removed from the cartridge housing, respectively. FIGS. 3A and 3B are views, similar to FIGS. 2A and 2B, illustrating yet another tape cartridge 10, wherein a shutter opening and closing mechanism 115 attached to a cartridge housing 110 cooperates with outward projection 58 attached to shutter 44 to automatically open and close the shutter 44.

These prior art tape cartridges having shutters give satisfactory results to some extent in protecting the tapes therein and also satisfactory operations in automatically opening and closing the shutters. However, their shutters 44 may be easily unintendly opened by external forces while the tape cartridges are stored or carried, as stated above. Namely, the shutters of the prior art tape cartridges shown in FIGS. 1, 2A, and 3A all having the projections 58 may be easily opened when the projections are touched with fingers or brought into contact with other objects while the tape cartridges are stored or carried. In order to prevent such inadvertent opening of the shutter due to external force, it has been suggested to increase the friction between the shutter 44 and the shutter guide 57. However, this is not preferable because of resulting in preventing the smooth movement of the shutter in its automatic opening and closing operations.

The present invention provides a tape cartridge having a shutter and a shutter opening and closing mechanism therefor which would perfectly protect a tape or other contents in the tape cartridge, whereby such unintended opening as experienced in the above prior art tape cartridges may be eliminated. Next, referring to FIGS. 4 through 12, the present invention will be explained more in detail with reference to a preferred embodiment thereof.

DESCRIPTION OF THE PREFERRED EMBODIMENTS

Figure 4B:
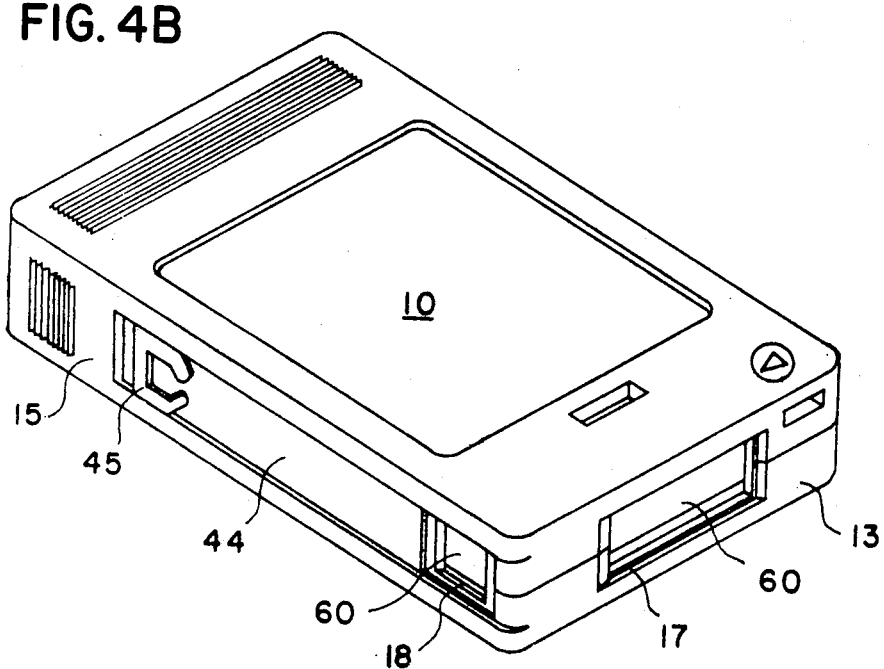

FIGS. 4A and 4B are perspective views illustrating the exterman appearances of an endless tape cartridge in accordance with an embodiment of the present invention with a shutter being in its closed and opened positions, respectively. FIGS. 5A-F show six plan views of the tape cartridge shown in FIG. 4A. All numerals hereinafter refer only to FIGS. 4A-13.

Referring to FIGS. 4A, 4B and 5, endless tape cartridge 10 in accordance with the present invention comprises a hollow container in the shape of a flat and substantially rectangular parallelepiped consisting of a pair of facing top and bottom walls 11 and 12, a pair of facing front and back walls 13 and 14 joining said top and bottom walls, and a pair of facing first and second side walls 16 and 15 joining the other walls. In practice, the tape cartridge 10 is preferably fabricated by a plastic molding technique, whereby an upper half 10a and a lower half 10b are separately formed respectively as integral units and then joined together by appropriate means (not shown).

Through a head receiving opening 17, an external magnetic read/write head 131 (FIG. 9) is brought into contact with magnetic tape 60 within tape cartridge 10. An external capstan 91 (FIG. 9) is drivingly engaged via tape 60 with a pinch roller 19 within the tape cartridge 10 via capstan receiving opening 18. The slidable shutter 44 protects the tape within the tape cartridge from dust and scratches due to external physical force by covering the openings 17 and 18. Shutter 44 is made of a flexible material such as a plastic thin plate. A detent 45 attached to the shutter 44 cooperates with a shutter opening and closing mechanism 122 (FIG. 9) of the tape cartridge player to be described later so that the shutter 44 is automatically opened and closed as the tape cartridge is inserted into and removed from a cartridge housing of the tape cartridge player. FIG. 4A illustrates the state of the tape cartridge where the openings 17 and 18 have been completely covered by the shutter 44, while FIG. 4B illustrates the state of the tape cartridge in its opened position where the tape 60 within the tape cartridge is exposed through the openings 17 and 18.

In a recessed area 41 at the center of the top wall 11, a label (not shown) on which desired data is to be written may be attached as required. A recess 48 is provided to be engaged with a cartridge retainer to be described later so that the tape cartridge 10 may be retained in a fixed playing position when it has been inserted into the cartridge housing 110 of the tape cartridge player (FIG. 9). A write protection knob 46, which is manually rotatable on its vertical axis between the position indicated and the position rotated by 180° therefrom, is constructed so as to cover an opening 47 from the inside at the position indicated but not at the position rotated by 180° therefrom. The write protection prevents other data from being written by mistake into the tape when the data stored on tape 60 is to be maintained. A tape player may respond to such write protection by arranging an actuation arm (not shown) of a microswitch (not shown) so that a contact of the microswitch may be switched on and off according to the opened and covered states of the opening 47. Knurlings 42 and 43 prevent the slip of the tape cartridge 10 when an operator inserts it into or removes it from the cartridge housing of the tape cartridge player.

Next, referring to FIGS. 6 through 8, the internal structure of the tape cartridge 10 in accordance with the present invention and the tape movement therein will be described. FIG. 6 is an enlarged sectional view taken along the line VI — VI of FIG. 5B in the direction indicated by the arrows and FIG. 7 is an enlarged sectional view taken along the line VII — VII of FIG. 5C in the direction indicated by the arrows. The tape 69 is now shown for the purpose of clarity. FIG. 8 is a sectional view similar to FIG. 6, illustrating the situation where the shutter 44 is opened, the tape 60 is stored in the form of a plurality of random loops, and the external magnetic head 131 and the external capstan 91 are engaged with the tape 60 inside the tape cartridge through the opening 17, 18, respectively.

Referring to FIGS. 6 and 7, a first internal wall 22 made of a plastic material extends along the first side wall 16 to form a narrow elongated first tape passageway 32 therebetween, and a second internal wall 21 made of a plastic material extends along the front wall 13 from the end of the first internal wall 22 on the side of the front wall 13 to the vicinity of the pinch roller 19 to form a second tape passageway 31. The second internal wall 21 has pad 25 of a material such as felt, urethane foams, etc. attached thereto so as to face the opening 17 formed in the front wall 13. Pad 25 resiliently presses tape 60 against a transducing surface of the magnetic head 131 (FIG. 8). Within the first tape passageway 32, pad 29, made of felt, sponge, etc., on side wall 16, applies back tension on the tape. Guide pole 26 guides the tape from tape passageway 32 to tape passageway 31. Near the entry of the first tape passageway 32, protrusion 52 projects inwardly from first side wall 16 toward a guide roller 53 rotatably mounted between the tip of the protrusion 52 and one end of the first internal wall 22. The protrusion 52 and the guide roller 53 guide the tape from wide tape receiving cavity 20 into the narrow tape passageway 32 without tape creasing and undue drag on the tape.

In FIG. 6, the head receiving opening 17 and the capstan receiving opening 18 respectively formed in the front wall 13 and the second side wall 15 are covered by the shutter 44. The shutter 44 is slid in shutter guide 57 extending along the front wall 13, the second side wall 15 and the back wall 14 between its closed position shown in FIG. 6 (corresponding to FIG. 4A) and its opened position shown in FIG. 8 (corresponding to FIG. 4B). As will be described later more in detail, the shutter 44 is automatically opened and closed by means of the detent 45 attached thereto and a mechanism 122 (FIG. 9) on the tape player.

FIG. 8 illustrates the tape movement in the tape cartridge 10 for storing the endless tape 60 therein in the form of a plurality of random loops. The tape 60 stored in the wide tape receiving cavity 20 is guided into the first tape passageway 32 from the entry thereof between the tip of the protrusion 52 and the guide roller 53, thence between the pad 29 for applying back tension to the tape and the first internal wall 22, toward the guide pole 26, and thence through the tape passageway 31 past the pad 25 and magnetic head 131. Then, tape 60 is guided along pinch roller 19 and thence between the pinch roller 19 and the capstan 91 which is extended into the tape cartridge 10 through the opening 18, whereby driving force is applied to the tape. When the capstan 91 is rotated in the direction indicated by the arrow C, the pinch roller 19 is rotated in the direction indicated by the arrow P, thereby causing the tape 60 to be driven in the direction indicated by the arrow T.

FIG. 9 is a perspective view illustrating the main parts of the tape cartridge player to be used with the tape cartridge 10 in accordance with the present invention. FIG. 10 is a perspective view, similar to FIG. 9, shown with a part of the cartridge housing cut away to illustrate the shutter opening and closing mechanism. Both FIGS. 9 and 10 illustrate the state where the tape cartridge 10 has been inserted into the tape cartridge player. The tape cartridge layer consists of capstan driving means 90 and the cartridge housing 110. The capstan driving means 90 comprises a capstan motor 92, the capstan 91 attached to one end of an output shaft 93 of said motor 92, a bracket (not shown) fixed to said motor 92 by using bolts or other appropriate means, a stud 98 fixed to said bracket and projecting therefrom through a base 97, a sleeve 94 fixed to said base 97 and projecting therefrom, a coil spring (not shown) fixed to a portion of said bracket at one end and to a stud (not shown) fixed to said base 97 at the other end, and a one-way clutch 96 attached to the other end of said output shaft 93 of said motor 92. The stud 98 is fit into the sleeve 94 through the base 97 engaged with said sleeve by appropriate means so that the bracket, accordingly the capstan 91, may be pivoted around but not axially of the axis of the stud 98. As the result, capstan 91 has a pivoting range restricted by the edge of a hole 95. The bracket is normally spring-biased by the coil spring (not shown) such that capstan 91 is biased clockwise around stud 98, so as to press against pinch roller 19 of the tape cartridge 10.

The tape player has a cartridge retainer on the upper wall of the cartridge housing 110, a leaf spring 111, fixed to housing 110 bolts or other appropriate means, has a wedge-shaped engaging member 112 at its free end. The leaf spring 111 and the engaging member 112 releasably retain cartridge 10 in the fixed playing position to secure the tape cartridge 10 into the fixed playing position. The tip of the engaging member 112 makes contact with the top wall 11 in recess 48 through an opening 113 formed in the upper wall of the housing 110.

The shutter 44 closing mechanism includes leaf spring 121 bolted on a side wall 114 of the cartridge housing 110. A shutter closing actuator 122 is attached to the free end of said spring 121. The shutter closing actuator 122 is in contact with the second side wall 15 of the tape cartridge 10 through an opening 116 in the side wall 114 (FIG. 10) and at this time the tip of the actuator 122 is engaged with the rear wall of the detent 45. As the tape cartridge 10 is removed from the cartridge housing 110, shutter 44 is automatically moved into the closed position by the engagement between the tip of the actuator 122 and detent 45. A shutter opening actuator 124 (FIG. 10) is attached to the inside of the side wall 114 of the housing and cooperates with the detent 45 to unlock it and move the shutter 44 automatically into its opened position during the insertion of tape cartridge 10.

As shown in FIG. 9, the capstan 91 is extended into the tape cartridge 10 through the opening 18 and pressed against the pinch roller 19 within tape cartridge 10. The transducing surface of the head 131 is pressed against tape 60 through the opening 17 formed in the front wall 13 of the tape cartridge 10. The electric wiring 103 for the head 131 and the capstan motor 92 is connected to electric circuits (not shown) via connectors 104.

Next, referring to FIGS. 9, 10, 11A and through 11C and 12A through 12B, the shutter of the tape cartridge and the shutter opening and closing mechanism in accordance with the present invention will be described more in detail FIGS. 11A, 11B and 11C are enlarged side views illustrating the surface of the second side wall 15 of the tape cartridge 10 with the shutter 44 being in its closed position, intermediate between its closed and opened positions, and in its opened position, respectively. FIG. 12A is a partly broken sectional view illustrating the operational engagement between the shutter 44 and the shutter opening and closing mechanism, namely the shutter closing actuator 122 and the shutter opening actuator 124, attached to the cartridge housing, and FIG. 12b is a view taken along the line XIIB — XIIB of FIG. 12A in the direction indicated by the arrows.

As stated above, the tape cartridge 10 is provided with the flexible shutter 44 made of a plastic thin plage or other material so that the shutter 44 is slidable in the shutter guide 57 between its closed position (FIGS. 4A, 6, 11A) and its opened position (FIGS. 4B, 11C, 12A). Shutter 44 has bifurcated or U-shaped detent 45 made of a flexible material such as plastic material, etc. The two bifurcated ends of the U-shaped detent 45 are not attached to the shutter. As shown clearly in the perspective views of FIGS. 4A and 4B and the enlarged sectional views of FIGS. 6 and 12A, the shutter 44 is positioned so as to be withdrawn from the outer surface of the side wall 15 of the tape cartridge 10 so that the outer surface of the U-shaped detent 45 is substantially flush with the outer surface of the side wall 15 of the tape cartridge. The side wall 15 has an opening 50 (an elongated rectangular position shown by solid lines in FIGS. 11A through 11C) having the same width as that of the U-shaped detent 45 to provide a travel path therefor when the shutter 44 is slid between its closed position and its opened position. The free ends of the U-shaped detent 45 are terminated with inclined tips 119 (FIG. 11A) projecting inwardly and further with pawls 49 projecting outwardly. Recesses 125 in the side edges of the opening 50 correspond to the positions where the pawls 49 of the detent 45 are to be located when shutter 44 is in its closed position. Accordingly, the pawls 49 fit into the recesses 125 when the shutter is in its closed position, thereby providing the shutter 44 with its closed-position self-locking function. As the result, the shutter 44 is kept closed by the engagement between the pawls 49 and the recesses 125 even when external force is applied to the shutter 44 or the detent 45 in the direction in which the shutter is opened. In order to enable the shutter 44 to be opened, the free ends of the U-shaped detent 45 are flexed inwardly as shown in FIG. 11B to disengage the pawls 49 from the recesses 125 before the shutter 44 is slid. Since such force enough to flex said free ends is hardly produced ordinarily while the tape cartridge is stored or carried nor easily applied with fingers, the shutter 44 may be self-locked in safety ordinarily while the tape cartridge is stored or carried.

In accordance with the present invention, the engagement between the pawls 49 of the shutter detent 45 and the recesses 125 in the side wall 15 may be automatically disengaged and thereby shutter 44 may be automatically opened when the tape cartridge is inserted into the cartridge housing of the tape cartridge player. Particularly referring to FIGS. 10, 12A and 12B, the shutter opening actuator 124 is attached to the inside of the side wall 114 of the cartridge housing 110. One end of the actuator 124 is V-shaped corresponding to the contour defined by the inclined tips 119 of the free ends of the U-shaped detent 45 and this V-shaped end forms a "V" notch 123 with the side wall 114 of the cartridge housing. When the tape cartridge 10 of which shutter is in its closed position is inserted into the cartridge housing 110, the inclined tips 119 of the detent 45 and first engaged with the :V: notch 123. As the tape cartridge 10 is pushed into the cartridge housing, the inclined tips 119 are flexed inwardly by its engagement with the "V" notch 123 and thereby the pawls 49 are disengaged from the recesses 125. As the tape cartridge 10 is further pushed into the cartridge housing, the shutter 44 is slid towards its opened position (FIG. 11B). When the tape cartridge 10 has been inserted into the fixed position of the cartridge housing, the shutter 44 is positioned in its fully opened position as shown in FIGS. 11C and 12A. As shown in FIG. 11C, recesses 126 are formed in the side edges of the opening 50 in the side wall 15 of the tape cartridge 10 corresponding to the positions where the pawls 49 are to be located with the shutter 44 is in its opened position. The recesses 126 provide spaces for the pawls 49 to prevent the free ends of the detent 45 from being kept flexed when the shutter is in its opened position. As the result, there is no possibility that the flexible detent 45 will be deformed when the shutter 44 is left in its opened position for an extended period of time.

Next, the closing operation of the shutter 44 will be explained. As illustrated in FIGS. 9, 10, and 12A, when the tape cartridge 10 has been inserted into the fixed position of the cartridge housing 110, a shoulder 129 (FIG. 12A) extending inwardly at the tip of the shutter closing actuator 122 is in contact with the rear wall of the detent 45. Then, as the tape cartridge 10 is removed from the cartridge housing 110, the shutter 44 is slid towards its closed position by the engagement between the shoulder 129 and the rear wall of the detent 45. When the shutter 44 has reached its closed position, the detent 45 is positioned as illustrated in FIGS. 4A and 11A. When the tape cartridge 10 is finally taken out of the cartridge housing 110, the detent 45 pressed against the shoulder 129 of the actuator 122, the actuator 122 is thereby inclined, and the detent 45 gets over the tip of the actuator 122. When the tape cartridge 10 is again inserted into the cartridge housing 110, the inclined tips 119 of the detent 45 are first engaged with a ramp surface 128 at the tip of the actuator 122 and as the tape cartridge is further inserted the detent 45 gets over the tip of the actuator 122 to be engaged with the "V" notch 123 as described above.

Thus, in accordance with the present invention, since the tape cartridge 10 is provided with the shutter 44 which can be self-locked in its closed position, the inside of the tape cartridge may be protected in safety from being exposed by the inadvertent opening of the shutter while the tape cartridge is stored or carried. Further, the shutter with a self-locking function in accordance with the present invention may be automatically unlocked to be opened when the tape cartridge is inserted into the cartridge housing and automatically locked in its closed position when the tape cartridge is removed from the cartridge housing.

FIG. 13 illustrates another embodiment of a shutter detent, wherein the shutter 44 may be self-locked in its closed position by the engagement between the pawls 49' formed at the free ends of a detent 45' and shoulders 127 formed in the side wall of the tape cartridge, and unlocked to be slid towards its opened position by flexing inwards inclined tips 119' of the detent 45' to disengage the pawls 49' from the shoulders 127. The inclined tips 119' of the detent 45' is no more flexed inwardly after the pawls 49' get over the shoulders 127. The automatic opening and closing operations of the shutter are the same as in the case of the previously stated embodiment.

While the present invention has been described with reference to the embodiments of magnetic tape cartridges, it should naturally be understood that the present invention may be also applied to any cartridge for storing other tapes such as an ink ribbon, a photographic film, etc., and further to any cartridge or container wherein an access opening to the inside thereof is desired to be covered while it is not used.

While the invention has been particularly shown and described with reference to preferred embodiments thereof, it will be understood by those skilled in the are that various changes in form and details may be made therein without departing from the spirit and scope of the invention.

What is claimed is:

1. A tape cartridge comprising a hollow container with a given exterior outline and having a tape receiving cavity for storing a tape therein, a peripheral wall of the container having at least one aperture means for receiving an external tape operating member for the tape in the container, a shutter guide extending across said aperture means along edges of said peripheral wall, a shutter slidable in said shutter guide along said peripheral wall between a closed position wherein said aperture means is covered and an opened position wherein said aperture means is exposed;

the improvement being characterized by:
a flexible bifurcated member attached to an outwardly facing surface of said shutter such that its bifurcated ends form free ends and having a longitudinal axis parallel to the direction of sliding movement of said shutter;
bifurcated member guide means in said peripheral wall for guiding said bifurcated member along the edges of said peripheral wall as said shutter slides;
outwardly projecting pawls disposed at the free ends of said bifurcated member and projecting towards said bifurcated member guide means; and
said bifurcated member guide means having recesses for engagingly receiving said pawls to inhibit movement of said shutter towards said opened position when said shutter is in said closed position.

2. The tape cartridge set forth in claim 1 wherein said shutter and said flexible bifurcated member reside entirely within said container outline at both said open and closed positions.

3. The tape cartridge set forth in claim 1 wherein said free ends of said flexible bifurcated member have outwardly facing cam surfaces adjacent said pawls whereby forces on said cam surfaces tend to move said free end toward each other for releasing said shutter for sliding movement.

4. The tape cartridge set forth in claim 1 wherein said peripheral wall includes a front wall portion adapted to face into a tape player and a first side wall portion joined to one end of said front wall portion, said shutter guide extending at least along said portions, said aperture means being in one of said portions;

the improvement further including in combination:
said flexible bifurcated member being disposed adjacent and outside said first side wall portion, said first side wall portion having an outwardly facing elongated recess for movably receiving said flexible bifurcated member to maintain said flexible bifurcated member within said cartridge outline.

5. The tape cartridge set forth in claim 4 wherein said flexible bifurcated member has a given sliding stroke length between said closed and opened position; and said first side wall portion recess having an elongation greater than said stroke length such that in said opened position said flexible bifurcated member is positioned adjacent but spaced from a rearward end portion of said recess whereby a shutter closing member can engage said flexible bifurcated member in said recess.

6. The tape cartridge set forth in claim 4 wherein said peripheral wall further includes:
a back wall portion opposite said front wall portion;
the improvement further including in combination:
said shutter guide extending from said first side wall portion onto said side back wall portion, said bifurcated member being affixed to said shutter at a midpoint of said shutter, such that in said closed position a portion of said shutter extending toward said rear wall portion from said bifurcated member extends beyond said recess in said first side wall portion and when said shutter is in said opened position, said portion thereof covering said aperture means when in the closed position extends forwardly from said bifurcated member toward said front wall portion being substantially contiguous with said recess at least to said aperture means.

7. The tape cartridge set forth in claim 6 wherein said aperture means includes first and second apertures, said front wall portion including said first aperture and said first side wall portion including said second aperture, and said second aperture being closer to said front wall portion than said rear wall portion.

8. The tape cartridge set forth in claim 1 wherein said bifurcated member guide means further includes:
recesses in said peripheral wall in juxtaposition to said bifurcated member being in its opened position for receiving said pawls.

9. A record medium cartridge having top and bottom walls joined by a peripheral wall having front, rear and first and second side wall portions, one of said wall portions having an aperture for enable access to the interior of said cartridge from outside said cartridge, said front wall portion adapted to be a leading portion when the cartridge is being moved to a operating position in a cartridge utilization device;

the improvement characterized in that:
said first side wall portion having a longitudinal recess of a first longitudinal length;
longitudinally extending guide means in said recess and extending across said aperture in said one side wall portion;
a shutter longitudinally movably disposed in said recess for movements between a closed position whereat said aperture is closed by said shutter and a opened position whereat said aperture is exposed; and
an operating member on said shutter disposed substantially within said recess for actuating said shutter for movements between said opened and closed positions and releasable restraining means on said operating member cooperating with said first wall portion for inhibiting movement of said shutter from one of said positions.

10. The cartridge set forth in claim 9 for operating with a cartridge utilization device having a closing member movable to said recess of said cartridge when said cartridge is in an operating routine in said cartridge utilization device further characterized in that when said shutter is in said opened position, said operating member in said recess is disposed from a longitudinal end of said recess adjacent said rear wall portion a predetermined space for permitting insertion of a closing member therebetween.

11. The cartridge set forth in claim 9 wherein said recess in said first side wall portion includes an aperture extending through said side wall portion;
   said guide means extending from said first side wall portion into said rear wall portion, and said shutter extending longitudinally toward both said front and rear wall portions a sufficient distance to close said recess aperture in both said opened and closed positions of said shutter.

12. The cartridge set forth in claim 11 wherein said one wall portion is said first side wall portion with said aperture being juxtaposed to said front wall portion and being aligned with said recess; and
   said guide means extending into said front wall portion; and
   said front wall portion having a second aperture to be covered by said shutter when said shutter is in said closed position.

13. The cartridge set forth in claim 9 further characterized in that said operating member includes a bifurcated portion extending longitudinally of said first side wall portion with first and second longitudinally extending flexible finger portions;
   each said finger having pawl extending toward said top and bottom walls respectively; and
   further having a camming surface on their respective free ends of said fingers such that, as forces are applied to camming surfaces said pawls are withdrawn from said guide means; and when said forces are removed, resiliency of said fingers move said pawls to bear against said guide means.

14. The cartridge set forth in claim 13 wherein said guide rail means includes recesses adjacent said closed position whereby said pawl detent inhibits said shutter from opening movements when in said closed position; and
   said operating member including a surface portion for receiving a shutter closing force and said camming surfaces being disposed such that as said fingers are moved away from said guide means, said shutter tends to move from said closed position toward said opened position.

15. In combination;
   a tape cartridge comprising a hollow container with a tape receiving cavity for storing a tape herein, a peripheral wall having at least one aperture means for receiving an external tape operating member for tape in said container, a shutter guide extending across said aperture means along edges of said peripheral wall, and a shutter slidable in said shutter guide along said peripheral wall between a closed position where said aperture means is covered and an opened position where said aperture means is exposed and a tape cartridge player adapted to receive said cartridge in a fixed playing position,
   characterized in that;
   said tape cartridge includes a flexible bifurcated member attached to an outer surface of said shutter such that its bifurcated ends form free ends and the longitudinal axis of the bifurcated member being parallel with the direction of sliding movement of said shutter, bifurcated member guide means formed in said peripheral wall for guiding said bifurcated member along the edges of said peripheral wall as said shutter slides, pawls disposed at the free ends of said bifurcated member and projecting towards said bifurcated member guide means, and said bifurcated member guide means having recesses for engagingly receiving said pawls to inhibit movements of said shutter towards said opened position when said shutter is in said closed position; and
   said tape cartridge player having an actuator positioned for engaging said bifurcated member when said cartridge is inserted into a cartridge housing of said tape cartridge player, said actuator comprising a stationary outwardly facing "V" notch for engaging said bifurcated member to flex said free bifurcated ends inwardly to unlock the pawls of the bifurcated member whereby the shutter automatically opens as the cartridge is inserted into said cartridge housing.

* * * * *